US012558831B2

(12) United States Patent
Oelschlegel et al.

(10) Patent No.: US 12,558,831 B2
(45) Date of Patent: Feb. 24, 2026

(54) PLANT FOR PRODUCING AN EXTRUDED SILICONE INTERMEDIATE, USE OF A COROTATING TWIN-SCREW EXTRUDER, AND PROCESS FOR PRODUCING A RAW SILICONE EXTRUDATE

(71) Applicant: RAUMEDIC AG, Münchberg (DE)

(72) Inventors: Alexander Oelschlegel, Konradsreuth (DE); Peter Wunderlich, Bad Steben (DE); Steffen Hager, Schwarzenbach an der Saale (DE); Sebastian Scharf, Rehau (DE)

(73) Assignee: RAUMEDIC AG, Münchberg (DE)

( * ) Notice: Subject to any disclaimer, the term of this patent is extended or adjusted under 35 U.S.C. 154(b) by 133 days.

(21) Appl. No.: 18/481,211

(22) Filed: Oct. 4, 2023

(65) Prior Publication Data

US 2024/0116233 A1      Apr. 11, 2024

(30) Foreign Application Priority Data

Oct. 6, 2022    (DE) ..................... 10 2022 210 592.3

(51) Int. Cl.
*B29C 48/405*        (2019.01)
*B29B 7/48*          (2006.01)
                (Continued)

(52) U.S. Cl.
CPC .......... *B29C 48/405* (2019.02); *B29C 48/022* (2019.02); *B29C 48/285* (2019.02); *B29C 48/505* (2019.02); *B29C 48/525* (2019.02); *B29C 48/802* (2019.02); *B29C 48/92*

(2019.02); *B29B 7/48* (2013.01); *B29C 2948/92542* (2019.02); *B29C 2948/92704* (2019.02);
(Continued)

(58) Field of Classification Search
CPC ... B29C 48/525; B29C 48/405; B29C 48/022; B29C 48/285; B29C 48/505; B29C 48/802; B29C 48/92; B29C 48/9105; B29C 48/09; B29C 48/12; B29C 2948/92542; B29C 2948/92704; B29C 2948/92714; B29C 48/91; B29B 7/48; B29K 2083/00; B29K 2105/24
See application file for complete search history.

(56) References Cited

U.S. PATENT DOCUMENTS 1,800,180 A * 4/1931 Day ...................... B29C 48/515
                                                      264/211.21
5,059,363 A * 10/1991 Davis ...................... B29C 48/19
                                                      425/141
(Continued)

FOREIGN PATENT DOCUMENTS

AT          507972          5/2011
AT          510263          6/2011
(Continued)

*Primary Examiner* — Jeffrey M Wollschlager
(74) *Attorney, Agent, or Firm* — Smartpat PLC

(57) ABSTRACT

A plant for producing an extruded silicone intermediate has a mixer/extruder for mixing and subsequently extruding a silicone compound for producing a raw silicone extrudate. A heating apparatus of the plant serves for crosslinking the raw extrudate to give the crosslinked silicone intermediate. The result is a plant with which a silicone intermediate of this kind can be produced more economically.

2 Claims, 3 Drawing Sheets

(51) Int. Cl.

| | |
|---|---|
| *B29C 48/00* | (2019.01) |
| *B29C 48/285* | (2019.01) |
| *B29C 48/505* | (2019.01) |
| *B29C 48/525* | (2019.01) |
| *B29C 48/80* | (2019.01) |
| *B29C 48/92* | (2019.01) |
| *B29K 83/00* | (2006.01) |
| *B29K 105/24* | (2006.01) |

(52) U.S. Cl.
CPC .......................... *B29C 2948/92714* (2019.02);
*B29K 2083/00* (2013.01); *B29K 2105/24*
(2013.01)

(56) References Cited

U.S. PATENT DOCUMENTS

| | | | | |
|---|---|---|---|---|
| 5,585,424 A * | 12/1996 | Ohata | ................... | C08F 265/04 |
| | | | | 526/279 |
| 6,391,234 B1 * | 5/2002 | Silvi | ..................... | B01F 33/821 |
| | | | | 524/588 |
| 9,752,031 B2 * | 9/2017 | Letailleur | ............... | C08L 83/04 |
| 2003/0203993 A1 * | 10/2003 | Katsumura | ........... | B29B 7/7485 |
| | | | | 524/495 |

| | | | | |
|---|---|---|---|---|
| 2004/0086592 A1 | 5/2004 | Winter et al. | | |
| 2005/0087908 A1 * | 4/2005 | Nasr | ........................ | B29C 39/02 |
| | | | | 264/255 |
| 2006/0247406 A1 * | 11/2006 | Reitmeier | ............... | B29B 7/826 |
| | | | | 524/588 |
| 2008/0069916 A1 * | 3/2008 | Regalia | ................... | B29B 7/489 |
| | | | | 425/204 |
| 2009/0040867 A1 | 2/2009 | Schulz | | |
| 2013/0107659 A1 | 5/2013 | Schulz et al. | | |
| 2020/0114604 A1 | 4/2020 | Zhu et al. | | |
| 2022/0227034 A1 * | 7/2022 | Sharifi | ................... | B29D 30/38 |
| 2023/0090345 A1 * | 3/2023 | Regalia | .................... | B29B 7/60 |
| | | | | 366/85 |
| 2023/0383067 A1 * | 11/2023 | Safarowsky | ............. | H01B 3/46 |

FOREIGN PATENT DOCUMENTS

| | | | |
|---|---|---|---|
| CN | 104640682 A | 5/2015 | |
| CN | 106810869 A | 6/2017 | |
| EP | 1558437 A1 | 8/2005 | |
| EP | 2580042 B1 | 7/2014 | |
| EP | 1951500 B1 | 8/2018 | |
| GB | 2384488 A | 7/2003 | |
| JP | 6808528 B | 1/2021 | |
| WO | 2014028625 A1 | 2/2014 | |

* cited by examiner

PLANT FOR PRODUCING AN EXTRUDED SILICONE INTERMEDIATE, USE OF A COROTATING TWIN-SCREW EXTRUDER, AND PROCESS FOR PRODUCING A RAW SILICONE EXTRUDATE

CROSS-REFERENCES TO RELATED APPLICATIONS

This application claims the priority of German Patent Application, Serial No. 10 2022 210 592.3, filed 6 Oct. 2022, the content of which is incorporated herein by reference in its entirety as if fully set forth herein.

FIELD OF THE INVENTION

The invention relates to a plant for producing an extruded silicone intermediate. The invention further relates to the use of a co-rotating twin-screw extruder and also to a process for producing a raw silicone extrudate.

BACKGROUND OF THE INVENTION

The production of an extruded silicone intermediate is known from the market as a batchwise operation in which the extrusion of a mixed silicone compound is preceded by a batchwise mixing/kneading operation.

Extrusion apparatus is known from AT 510 263 B1, EP 2 580 042 B1, AT 507 972 B1 and EP 1 951 500 B1. WO 2014/028625 A1 describes an apparatus and a process for producing a silicone article. EP 1 558 437 B1 discloses a process for extruding peroxidic crosslinkable mouldings from plastic.

SUMMARY OF THE INVENTION

It is an object of the present invention to provide a plant for producing an extruded silicone intermediate that allows such a silicone intermediate to be produced more economically.

This object is achieved in accordance with the invention by a plant for producing an extruded silicone intermediate, having a mixer/extruder for mixing and subsequently extruding a silicone compound including a crosslinker additive, for producing a raw silicone extrudate, having a heating apparatus for crosslinking the raw extrudate to give the crosslinked silicone intermediate, wherein the mixer/extruder is configured in such a way that during mixing and during extrusion, the temperature of the silicone compound does not exceed 60°.

In general, the produced extruded silicone intermediate is a semi-finished product, e.g. a tube or a profile.

It has been recognized in accordance with the invention that it is possible, using a mixer/extruder, to produce a raw silicone extrudate which initially is still uncrosslinked and which is crosslinked subsequently by means of the heating apparatus of the plant to give the crosslinked silicone intermediate. With a plant of this kind, the crosslinked silicone intermediate can be produced in a continuous operation, this being more economical by comparison with the batchwise operation of the prior art. The production operation can be simplified. The output of the plant is improved. In comparison to the batchwise operation, internal logistical expenditures are reduced. In comparison to the batchwise operation, an energy saving can be enabled.

In particular, in the operation of such a plant, the batchwise kneading operation of the process known from the prior art is absent.

The limiting temperature value of 60° C. which the silicone compound does not exceed during mixing and during extrusion prevents unwanted crosslinking of the silicone compound and of the raw silicone extrudate, respectively. The temperature threshold which is not exceeded during mixing and during extrusion when using the mixer/extruder of the plant may also, according to configuration and/or according to operation of the plant, be situated at 58° C., at 56° C., at 54° C., at 53° C., at 51° C., at 50° C., at 45° C. or else at 40° C. This temperature threshold is generally greater than 20° C.

The mixer/extruder of the plant may be configured such that the energy input into the silicone compound during mixing and during extrusion in total is always less than 20 Wh/kg, is less than 10 Wh/kg and is also less than 9 Wh/kg. An energy input of this kind is generally greater than 1 Wh/kg.

The mixer/extruder may be configured such that during mixing and during extrusion of the silicone compound, at least one extruder screw of the mixer/extruder does not exceed a speed of 150 revolutions per minute. A threshold speed value of this kind is particularly suitable for preventing unwanted crosslinking of the silicone compound or of the raw silicone extrudate, respectively.

The mixer/extruder may be configured such that after mixing and extrusion the resulting raw silicone extrudate is available such well homogenized that a crosslink degree, measured for several random sample volumina of the raw silicone extrudate, is reached after respective measurement periods which do not deviate from each other by more than +/−10%. In a corresponding homogeneity measurement of the raw silicone extrudate a measurement of viscoelastic properties of the raw silicone extrudate can be carried out in accordance with norm DIN ISO 6502. The period $T_{90}$, within which a crosslink degree of 90% is reached, for each individual sample from an average value, measured across all sample volumina, may not deviate by more than 10%, by more than 8%, by more than 6%, by more than 5%, by more than 4%, by more than 3% and by more than 2% or even by more than 1%.

Corresponding measurement period conditions can also apply for a period $T_{10}$ for reaching a crosslink degree of 10% of the raw silicone extrudate in a viscoelastic measurement or also for a period $T_{50}$ for reaching a crosslink degree of 50% of the raw silicone extrudate.

A crosslink of e.g. 90% is given when a torque support in the viscoelastic measurement according to DIN ISO 6502 corresponds to 90% of a maximum torque support in a crosslink of 100%. There, the crosslink of 100% unfolds as a plateau value of the torque over the time.

The plant may have a feed apparatus for adding the generally still unmixed silicone compound and optionally additives, especially crosslinker additives, to the mixer/extruder. Part of the feed apparatus may be at least one feed facility with which components may be added via a respective provision container. The feed apparatus and/or the respective feed facility may be configured as a hopper, as a press, as a flap, as a cutting apparatus or as a gravimetric metering device. If two or more feed facilities are employed, it is also possible for different such variants to be used in the case of a feed apparatus comprising these feed facilities.

The silicone compound which is processed in the plant may have a viscosity in the initial state, i.e. before the mixing and the extrusion or else after the mixing and before the extrusion, of more than $4\times10^7$ cp (centipoise, 1 cP=$10^{-3}$ Pa s). This viscosity may be greater than $5\times10^7$ cp, may be greater than $7\times10^7$ cp, and may be at least $9\times10^7$ cp. This viscosity is generally less than $100\times10^7$ cp.

The viscosity can be measured according to DIN ISO 6502.

A configuration of the mixer/extruder as a co-rotating twin-screw extruder has proved surprisingly to be suitable for producing the as yet uncrosslinked raw silicone extrudate. It has emerged here that it is possible to operate a co-rotating twin-screw extruder of this kind such that the extrudate does not attain crosslinking temperature limits.

A twin-screw extruder, in which extruder screws of the twin-screw extruder taper conically towards an extrusion die, has been found particularly appropriate.

It is a further object of the invention to specify a new use of a co-rotating twin-screw extruder.

This object is achieved in accordance with the invention by the use of a co-rotating twin-screw extruder for producing a raw extrudate by mixing and subsequently extruding a silicone compound.

Surprisingly it has emerged that a co-rotating twin-screw extruder can be operated such as to result in an as yet uncrosslinked raw silicone extrudate. This co-rotating twin-screw extruder is utilized simultaneously for mixing and for extrusion. The co-rotating twin-screw extruder is fed with as yet unmixed silicone compound, comprising at least one crosslinker additive.

The advantages of the use of a twin-screw extruder according to the invention, in which extruder screws of the twin-screw extruder taper conically towards an extrusion die, correspond to those already explained above.

It is a further object of the invention to specify a process for producing a raw silicone extrudate.

This object is achieved in accordance with the invention by a process for producing a raw silicone extrudate, with steps as follows:

providing an as yet unmixed silicone compound, comprising at least one crosslinker additive, adding the silicone compound to a mixer/extruder, mixing the silicone compound in the mixer/extruder, extruding the mixed silicone compound by means of the mixer/extruder.

By means of this process, the raw silicone extrudate is generated in a continuous operation, offering advantages in economic terms, as have already been explained above, by comparison with a batch operation.

In particular, low melt temperatures of the extrudate can be achieved. Unwanted crosslinking of the raw silicone extrudate produced can be avoided.

A mixing homogeneity of the silicone compound, attained as a result of the mixing step, for which a fraction of the crosslinker additive within the silicone compound fluctuates by less than 5% is of particular advantage and enables the production of a raw silicone extrudate and, subsequently, of a crosslinked, extruded silicone intermediate of high quality. The mixing homogeneity can be measured by determining when a predetermined crosslink degree, e.g. a crosslink of 90%, is reached. In doing so, a rheometer and a method for measuring viscoelastic properties according to DIN ISO 6502 can be applied. Here, a deviation of a mixing homogeneity by less than 10% is the equivalent to a deviation width of a period, within which a crosslink degree, e.g. $T_{90}$, measured over the viscoelastic properties, is reached. Here, a mixing homogeneity deviating by less than 10% is the equivalent to a mixing homogeneity of the silicone compound and the raw silicone extrudate, respectively, in which in several random sample volumina a determined crosslink degree is reached in a period reproducible by less than 10%. The mixing homogeneity can deviate by less than 5%, by less than 2% or also by less than 1%. The additive fraction within the silicone compound may fluctuate by less than 2% and may also fluctuate by less than 1%. This mixing homogeneity and this fraction, respectively, generally fluctuates by more than 0.01%.

A limiting temperature value, in which during mixing and during extrusion, the temperature of the silicone compound does not exceed 60° C., prevents unwanted crosslinking of the raw silicone extrudate. The temperature threshold which is not exceeded during mixing and during extrusion when using the production process for the raw silicone extrudate may be situated at 58° C., at 56° C., at 54° C., at 53° C., at 51° C., at 50° C., at 45° C. or else at 40° C. This temperature threshold is generally greater than 20° C. An energy input into the silicone compound during mixing and during extrusion in the mixer/extruder in total may always be less than 20 Wh/kg, may be less than 10 Wh/kg and may also be less than 9 Wh/kg.

A threshold speed value, in which the mixer/extruder has at least one extruder screw, and during mixing and during extrusion of the silicone compound, the at least one extruder screw does not exceed a speed of 150 revolutions per minute, has emerged as being particularly suitable in the context of preventing unwanted crosslinking of the raw silicone extrudate.

An exemplary embodiment of the invention is explained in more detail below with reference to the drawing.

DESCRIPTION OF THE PREFERRED EMBODIMENT

Figure 1:
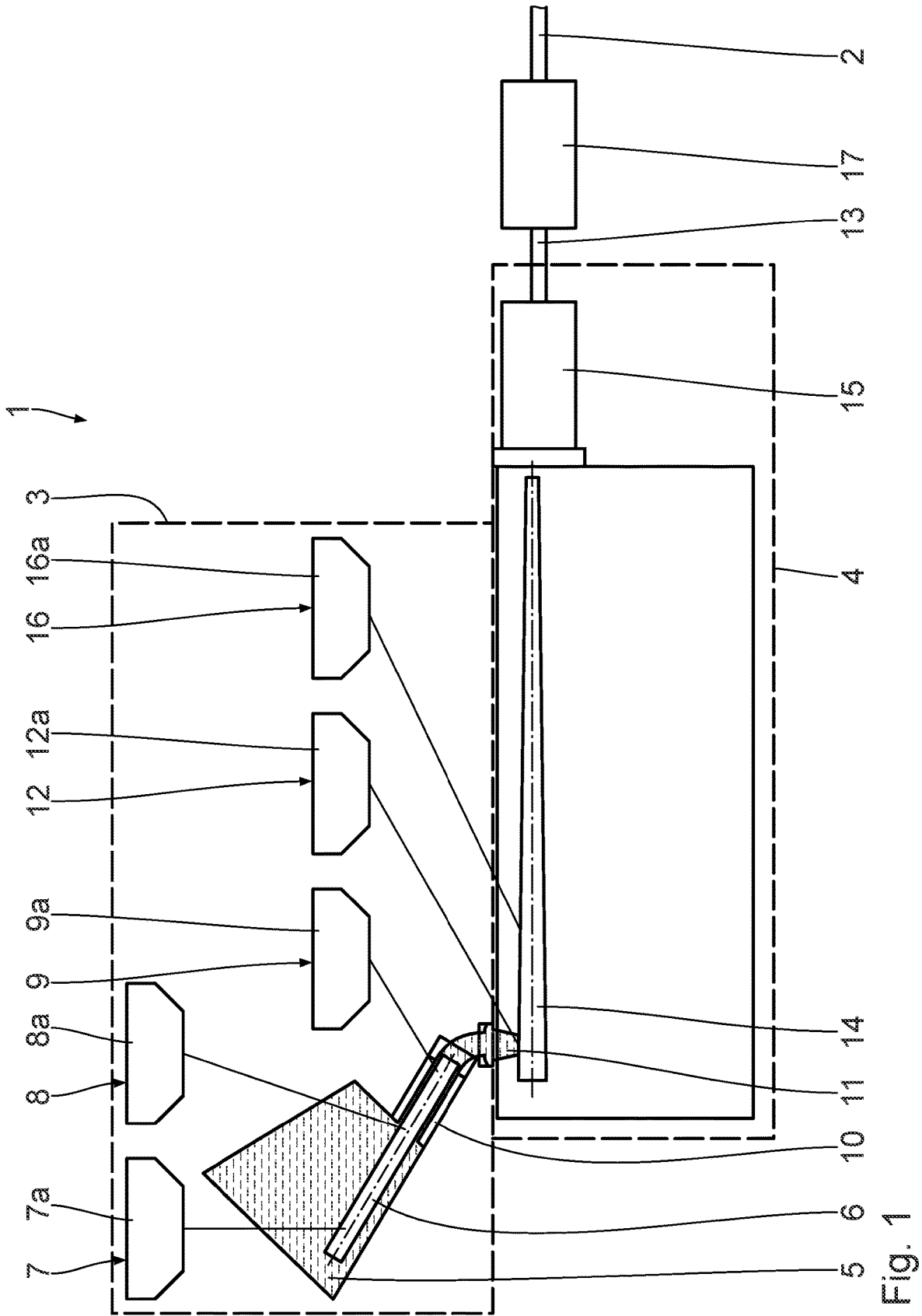
FIG. 1 shows a plant for producing an extruded silicone intermediate.

FIG. 1 shows an embodiment of a plant 1. The plant 1 serves for producing an extruded silicone intermediate 2. This extruded silicone intermediate 2 is produced in the form of a continuous profile, for example as a flexible tube.

The plant 1 has a feed apparatus 3 for adding a provided, as yet unmixed silicone compound and additives, especially crosslinker additives, to a mixer/extruder 4 which is likewise part of the plant 1.

The feed apparatus 3 supplies the mixer/extruder 4 with raw silicone materials, fillers and additives. By way of the feed apparatus 3, these components can be fed to the mixer/extruder 4 at different points, as explained further below. In particular, a feed may take place in the region of an intake, in a mixing region and/or in a discharge region of the mixer/extruder 4.

The feed apparatus 3 has at least one feed hopper 5, which in turn has a feed screw 6. The feed hopper 5 and the feed screw 6 running within the feed hopper 5 have raw materials of the silicone compound and also additives added to them by way of a plurality of feed facilities 7, 8, 9. By means of the feed facility 7, the addition is made from a provision container 7a to an upstream section of the feed screw 6. Via the feed facility 8, a feed takes place from a provision container 8a to a middle section of the feed screw 6, which is arranged in turn at the level of a conically tapered outlet section of the feed hopper 5. By means of the feed facility 9, the feed takes place from a provision container 9 to a downstream section of the feed screw 6, which runs in a screw sleeve 10, which is in fluid communication with the delivery end of the feed hopper 5.

The screw sleeve 10 is in communication in turn with an addition port 11 of the mixer/extruder 4. In the region of the addition port 11, there is a further addition of compound constituents and of additives via a further feed facility 12 of the feed apparatus 3 with a provision container 12a.

The mixer/extruder 4 serves for mixing and subsequently extruding the as yet unmixed silicone compound provided via the feed apparatus 3, and the additives, for producing a raw silicone extrudate 13.

The mixer/extruder 4 is configured as a co-rotating twin-screw extruder. One of the two extruder screws 14 is represented in FIG. 1. The two extruder screws 14 of the twin-screw extruder taper conically toward a downstream extrusion die 15 of the mixer/extruder 4, which is also referred to as the head tooling.

In the operation of the mixer/extruder 4, the raw silicone extrudate 13 emerges from the extrusion die 15.

In an upstream section of the extruder screws 14, there is a further addition of raw materials of the silicone compound and/or of additives via a further feed facility 16 of the feed apparatus 3 with a provision container 16a.

Positioned after the mixer/extruder 4 is a heating apparatus 17 of the plant 1 for crosslinking the raw silicone extrudate 13 to give the crosslinked, extruded silicone intermediate 2.

With the plant 1, the extruded, crosslinked silicone intermediate 2 is produced continuously, i.e. not batchwise.

Figure 2:
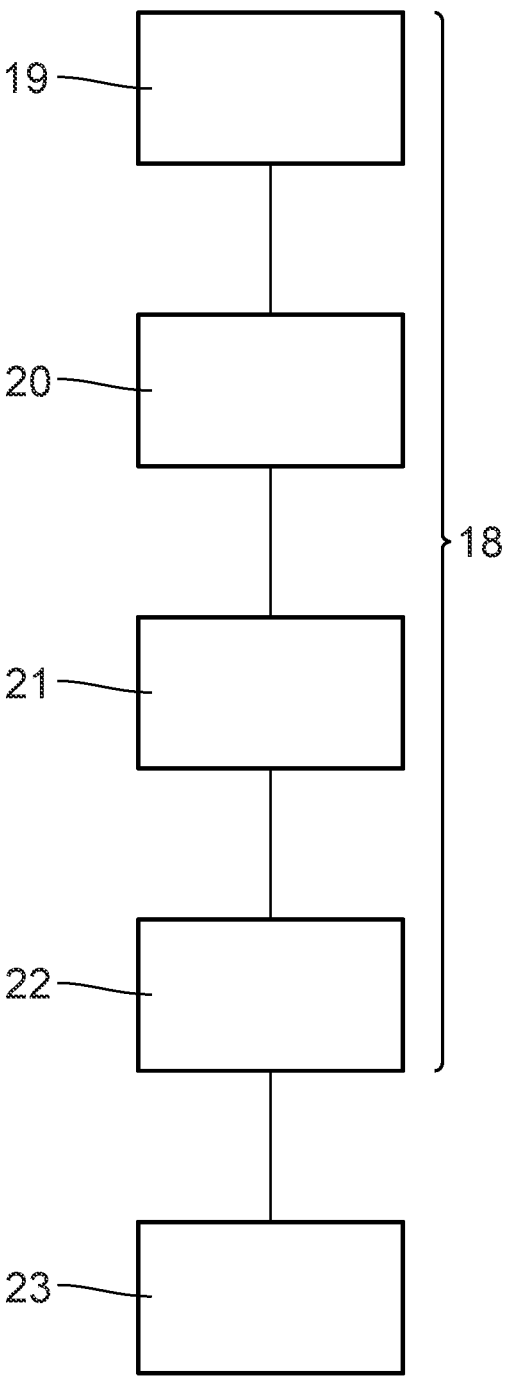
FIG. 2 shows a process for producing a raw silicone extrudate as part of a process for producing an extruded silicone intermediate.

With reference to FIG. 2, a production process 18 is described for producing the raw silicone extrudate 13, as part of an overall process for producing the extruded, crosslinked silicone intermediate 2.

In a provision step 19, the as yet unmixed silicone compound is provided together with the at least one additive. This is accomplished by filling of the provision containers 7a, 8a, 9a, 12a and 16a with corresponding constituents on the one hand of the silicone compound, i.e. with corresponding raw materials, and also with one or, where appropriate, two or more additives, more particularly with a crosslinker additive. In the provision containers 7a, 8a, 9a, 12a and 16a, different compositions of raw materials and/or additives may be provided.

In the subsequent continuous operation, the feed facility 3 and the mixer/extruder 4 are put into operation. In an addition step 20, the initially still unmixed silicone compound and also the at least one additive are added to the mixer/extruder 4. This is accomplished by way of the feed facilities 7, 8, 9, 12 and 16 of the feed apparatus 3. During operation of the feed apparatus 3, the feed screw 6 rotates in the feed hopper 5, and so silicone compound present therein and at least one additive optionally added there are discharged from the feed hopper 5 through the screw sleeve 10 to the addition port 11 of the mixer/extruder 4.

The silicone compound, including the at least one additive, is then mixed 21 in the mixer/extruder 4 by the operation of the two extruder screws 14. Mixing takes place here firstly of the compound, which is fed via the addition port 11 to the extruder screws 14, and of additional raw materials and/or additives, which are fed to the extruder screws 14 downstream of the addition port 11 via the at least one further addition facility 16.

By means of the mixer/extruder 4, in an extrusion step 22, the mixed silicone compound, including the at least one additive, is extruded via the extrusion die 15, resulting in the as yet uncrosslinked raw silicone extrudate 13.

As a result of the mixing step 21, a mixing homogeneity of the silicone compound including the at least one additive is attained for which a fraction of the at least one additive, more particularly of the crosslinker additive, within the silicone compound in the region of the extrusion die 15 fluctuates by less than 5%, by less than 2% and even by less than 1%.

An energy input to the plant 1 during the mixing 21 and during the extrusion 22 into the silicone compound including the at least one additive, during the entire production operation, is less than 20 Wh/kg, less than 10 Wh/kg and may in particular be less than 9 Wh/kg and may be even lower. During the mixing 21 and during the extrusion 22, the temperature of the silicone compound including the at least one additive in the mixer/extruder 4 does not exceed 53° C. This mixing/extrusion temperature of the silicone compound including the at least one additive within the extruder 4 may be at most 50° C., at most 45° C. or else at most 40° C. This temperature is generally greater than 20° C. The effect of this mixing/extrusion temperature is that within the extruder 4 there is no unwanted crosslinking of the raw silicone extrudate 13.

The speed of the extruder screws 14 during the mixing 21 and during the extrusion 22 does not exceed a limiting value of 150 revolutions per minute.

The twin-screw extruder of the mixer/extruder 4 is used for producing the raw extrudate 13 by the mixing 21 and the subsequent extrusion 22 of the silicone compound including the at least one additive.

On emergence from the extrusion die 15, the raw silicone extrudate 13 is crosslinked in a crosslinking step 23 by means of the heating apparatus 17 to give the crosslinked silicone intermediate, this taking place likewise in a continuous operation. In this operation, the extrudate 13 passes through the heating apparatus 17, from which it emerges as the crosslinked silicone intermediate 2.

Figure 3:
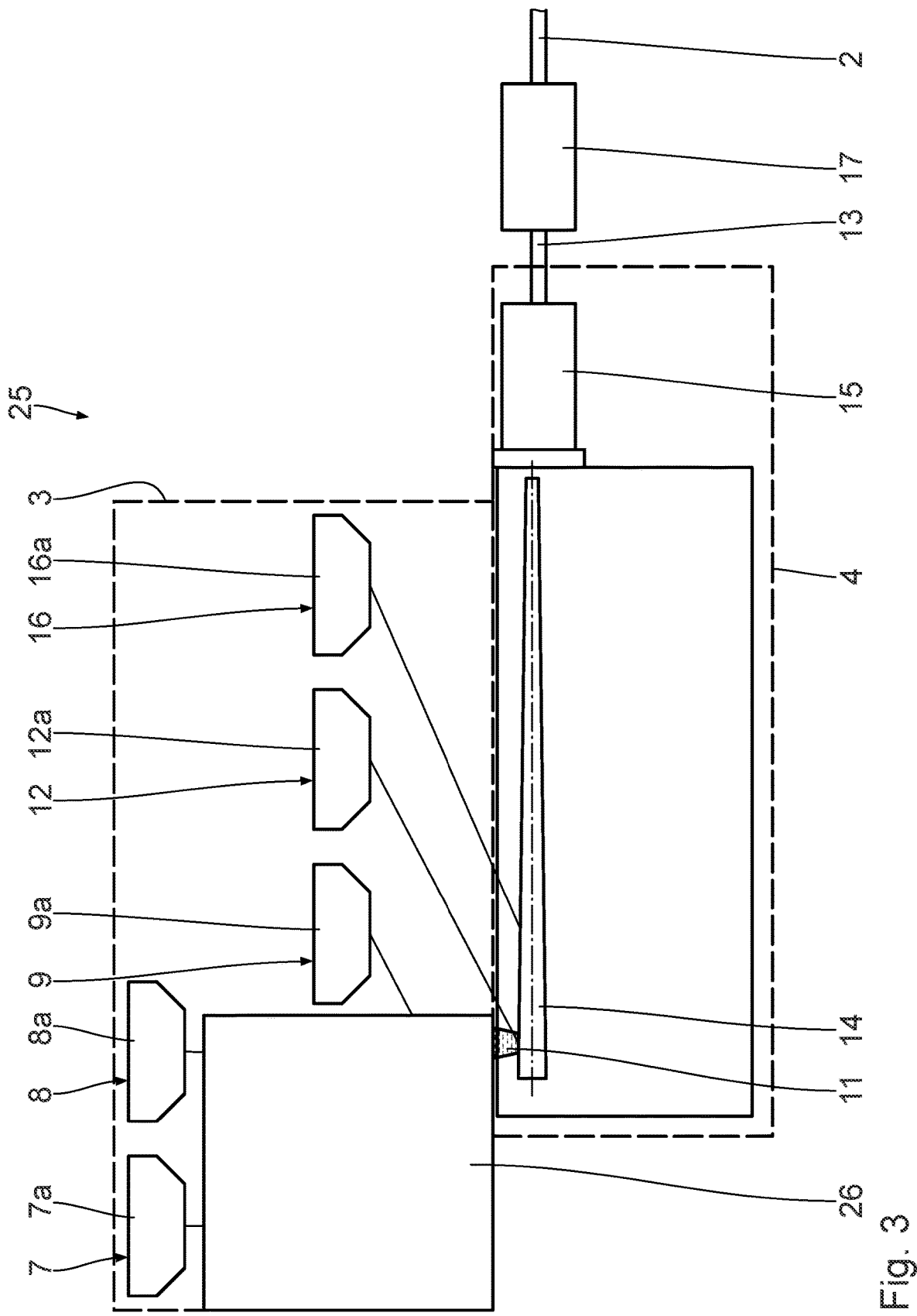
FIG. 3, in a representation similar to that of FIG. 1, shows a further embodiment of a plant for producing an extruded silicone intermediate.

FIG. 3 shows a further embodiment of a plant 25 for producing an extruded silicone intermediate, which may be employed instead of FIG. 1. Components and functions of the plant 25 which have already been explained above in connection with the description of the plant 1 with reference to FIGS. 1 and 2 carry the same reference numerals and are not discussed again in detail.

As a constituent of the feed apparatus 3, the plant 25 has a feed facility 26.

According to the configuration of the plant 25, the feed apparatus 3 with the feed facility 26 may be divided into subregions, particularly into sub-feed apparatuses for individual components or groups of the components to be fed in, i.e. of the raw silicone materials, the fillers and the additives.

According to configuration, the feed facility 26 may have a premixing unit for premixing the raw silicone materials, the fillers and the additives. The feed facility 26 feeds the raw silicone materials, the fillers and the additives to the mixer/extruder 4 continuously, at constant mass flow rate and/or at constant volume flow rate. The outcome, in conjunction with the mixer/extruder 4, is an overall continuous production operation for the raw extrudate 13 and/or the crosslinked silicone intermediate 2. For the raw extrudate 13 and for the silicone intermediate 2, correspondingly, constant mixing and homogeneity properties may result.

What is claimed is:

1. A plant for producing an extruded silicone intermediate, comprising:

a mixer/extruder for mixing and subsequently extruding a silicone compound including crosslinker additives, for producing a raw silicone extrudate;

a feed apparatus for feeding raw materials of the silicone compound and the crosslinker additives to the mixer/extruder; and a heating apparatus for crosslinking the raw silicone extrudate to produce a crosslinked silicone intermediate, wherein the feed apparatus is a co-rotating twin-screw extruder including two extruder screws that taper conically toward a downstream extrusion die, wherein the feed apparatus includes a feed hopper for receiving the raw materials of the silicone compound, a feed screw disposed within the feed hopper, and a plurality of feed facilities for feeding the raw materials and/or the crosslinker additives, wherein the plurality of feed facilities include a first feed facility including a first provision container in fluid communication with an upstream section of the feed screw, a second feed facility including a second provision container in fluid communication with a middle section of the feed screw proximal to a conically tapered outlet section of the feed hopper, a third feed facility including a third provision container in fluid communication with a downstream section of the feed screw at a screw sleeve, the screw sleeve being in fluid communication with a delivery end of the feed hopper and an addition port of the mixer/extruder, a fourth feed facility including a fourth provision container in fluid communication with the addition port, and a fifth feed facility including a fifth provision container in fluid communication with an upstream section of the two extruder screws, wherein the mixer/extruder is configured such that during mixing and during extrusion a temperature of the silicone compound does not exceed 60° C., wherein the mixer/extruder is configured such that an energy input into the silicone compound during mixing and during extrusion in total is always less than 20 Wh/kg.

2. The plant according to claim 1, wherein the plant is configured for continuous, not batchwise, operation.

\* \* \* \* \*